US008715552B2

(12) United States Patent
Uchimura et al.

(10) Patent No.: US 8,715,552 B2
(45) Date of Patent: May 6, 2014

(54) PRODUCTION METHOD OF AROMATIC POLYCARBONATE

(75) Inventors: Ryuuji Uchimura, Kitakyushu (JP); Hideki Murakami, Kitakyushu (JP)

(73) Assignee: Mitsubishi Chemical Corporation, Tokyo (JP)

( * ) Notice: Subject to any disclaimer, the term of this patent is extended or adjusted under 35 U.S.C. 154(b) by 450 days.

(21) Appl. No.: 12/522,720

(22) PCT Filed: Nov. 19, 2007

(86) PCT No.: PCT/JP2007/072414
§ 371 (c)(1),
(2), (4) Date: Jul. 10, 2009

(87) PCT Pub. No.: WO2008/090673
PCT Pub. Date: Jul. 31, 2008

(65) Prior Publication Data
US 2010/0244303 A1    Sep. 30, 2010

(30) Foreign Application Priority Data

Jan. 24, 2007  (JP) ................................ 2007-014309
Nov. 8, 2007   (JP) ................................ 2007-291018

(51) Int. Cl.
*B29C 47/00* (2006.01)
(52) U.S. Cl.
USPC ........................................ 264/148; 264/141
(58) Field of Classification Search
USPC ................................. 264/143, 148
See application file for complete search history.

(56) References Cited

U.S. PATENT DOCUMENTS

| 5,756,658 A | 5/1998 | Onodera et al. |
| 2005/0170180 A1 | 8/2005 | Kawa |
| 2007/0045893 A1* | 3/2007 | Asthana et al. .......... 264/173.12 |
| 2008/0234445 A1 | 9/2008 | Hamano et al. |

FOREIGN PATENT DOCUMENTS

| JP | 61 195808 | 8/1986 |
| JP | 5 253997 | 10/1993 |
| JP | 2003 220607 | 8/2003 |
| JP | 2004 299314 | 10/2004 |
| JP | 2005 113119 | 4/2005 |
| WO | 96 37353 | 11/1996 |
| WO | 2004 033558 | 4/2004 |

OTHER PUBLICATIONS

Machine Translation of JP 05-253997, Urabe et al., Oct. 5, 1993.*

(Continued)

*Primary Examiner* — Galen Hauth
(74) *Attorney, Agent, or Firm* — Oblon, Spivak, McClelland, Maier & Neustadt, L.L.P.

(57) ABSTRACT

The object of the present invention is to provide a production method for an aromatic polycarbonate, in which eye boogers at the time of extrusion molding are reduced, and a continuous operation for a long period of time is possible. The present invention relates to a method when an extrusion molding is produced using an extruder in which a tapered part 1 has a half apex angle of from 4 to 20° formed at the outlet part of a die hole 9, and outlet parts of plural die holes 9 are arranged in a staggered state at the resin discharge surface side of a die plate 10, the shear rate γ at the extruder outlet is from 100 to 500 sec$^{-1}$, and the shear stress τ is from 50 to 200 kPa.

8 Claims, 3 Drawing Sheets

(56) References Cited

OTHER PUBLICATIONS

Machine Translation of JP 2005-113119, Miyamoto et al., Apr. 28, 2005.*

Search Report and Written Opinion issued Jun. 15, 2010 in Singapore Patent Application No. SG 200904930-5 filed Nov. 19, 2007.

Chinese Office Action issued Mar. 18, 2011, in Patent Application No. 200780027539.4 (with English-language translation).

Chinese Office Action issued on May 24, 2012, in patent Application No. 200780027539.4 with English Translation.

Office Action issued Feb. 10, 2014, in India Patent Application No. 4396/DELNP/2009 filed Mar. 7, 2009.

* cited by examiner

PRODUCTION METHOD OF AROMATIC POLYCARBONATE

TECHNICAL FIELD

The present invention relates to a production method of an aromatic polycarbonate. More particularly, it relates to a production method of an aromatic polycarbonate, which can remarkably restrain generation of eye boogers at the time of extrusion molding.

BACKGROUND ART

Conventionally, an interface method in which an alkali aqueous solution of bisphenols and phosgene are reacted in the presence of an organic solvent, and a melting method in which bisphenols and a carbonic diester are polycondensation reacted by an ester exchange reaction are known as a production method of an aromatic polycarbonate. Above all, the melting method by the ester exchange reaction has the advantage that an aromatic polycarbonate resin can be produced inexpensively as compared with the interface method.

In the melting method, polycondensation reaction is conducted in a molten state using a molten mixture of raw materials of an aromatic dihydroxy compound and a carbonic diester in the presence of an ester exchange reaction catalyst, and after stopping the polycondensation reaction, an aromatic polycarbonate formed into pellets having a given particle size is obtained.

By the way, when a thermoplastic resin such as a polycarbonate is extrusion molded to form pellets, there was the problem that a deteriorated material generally called eye boogers is generated at an outlet of a flow path of a die, and adhered thereto, and such a deteriorated material is mixed into products, resulting in defective product. To prevent the deteriorated material form being accompanied with products, it is necessary to conduct a cleaning frequently, and this constituted a factor to decrease production capacity and to increase production loss.

In view of the above, the present applicant reported that generation of eye boogers can remarkably restrained by providing a taper at an outlet part of a flow path of a die (hereinafter sometimes referred to as a "die hole") (see Patent Document 1).

Patent Document 1: JP-A-05-253997

DISCLOSURE OF THE INVENTION

Problems that the Invention is to Solve

However, as a result of investigations in detail, when continuous operation for a long period of time is carried out, it was revealed that to restrain eye boogers generated on the outlet part of a die hole, it is not sufficient to only provide a taper on the outlet part of a die, and further improvement is necessary.

The present invention has been made to solve those problems in the production of an aromatic polycarbonate.

Accordingly, an object of the present invention is to provide a production method of an aromatic polycarbonate, in which eye boogers at the time of extrusion molding are reduced, and continuous operation for a long period of time is possible.

Means for Solving the Problems

According to the present invention, there is provided a production method of an aromatic polycarbonate, characterized in that in a method for extrusion molding an aromatic polycarbonate with an extruder and pelletizing the same, extrusion molding is conducted under that a shear rate ($\gamma$) of the aromatic polycarbonate at an outlet of the extruder is in a range of from 100 to 500 $\sec^{-1}$, and a shear stress ($\tau$) of the aromatic polycarbonate at the outlet of the extruder is in a range of from 50 to 200 kPa.

In the production method of an aromatic polycarbonate to which the present invention is applied, it is preferred that the extruder used for extrusion molding is equipped with a die for extruder having a taper having a half apex angle of from 4 to 20° formed on the outlet part of the die for extruder.

The extruder is preferably that die holes formed on a die plate are arranged in a staggered state.

The aromatic polycarbonate is preferably obtained by a reaction between an aromatic dihydroxy compound and a carbonic diester.

The aromatic polycarbonate produced by the production method of an aromatic polycarbonate of the present invention is preferably that a viscosity average molecular weight (Mv) is 13,000 or more, the proportion of hydroxyl group (OH) in the whole terminal groups is from 5 to 50 molds, and a ratio of the total mole number of branched structural units to one mole of a structural unit represented by the following formula (a) is from 0.1 to 0.8 mol %.

[Chem. 1]

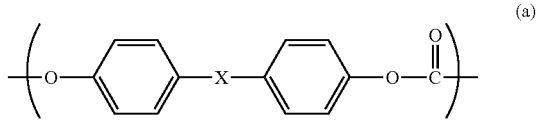

(In the formula (a), X represents a single bond, an alkylene group having from 1 to 8 carbon atoms, an alkylidene group having from 2 to 8 carbon atoms, a cycloalkylene group having from 5 to 15 carbon atoms, a cycloalkylidene group having from 5 to 15 carbon atoms, or a divalent group selected from the group consisting of —O—, —S—, —CO—, —SO— and —$SO_2$—.)

That is, the gist of the present invention resides in the following (1) to (5).

(1) A production method of an aromatic polycarbonate, characterized in that in a method for extrusion molding an aromatic polycarbonate with an extruder and pelletizing the same, extrusion molding is conducted under that a shear rate ($\gamma$) at an outlet of the extruder is in a range of from 100 to 500 $\sec^{-1}$, and a shear stress ($\tau$) at the outlet of the extruder is in a range of from 50 to 200 kPa.

(2) The production method of an aromatic polycarbonate as described in (1), characterized in that a die for extruder having a taper having a half apex angle of from 4 to 20° formed on the outlet part of the die for extruder is used.

(3) The production method of an aromatic polycarbonate as described in (1) or (2), characterized in that die holes formed on a die plate are arranged in a staggered state.

(4) The production method of an aromatic polycarbonate as described in any one of (1) to (3), characterized in that the aromatic polycarbonate is obtained by a reaction between an aromatic dihydroxy compound and a carbonic diester.

(5) The production method of an aromatic polycarbonate as described in any one of (1) to (4), characterized in that a viscosity average molecular weight (Mv) is 13,000 or more, the proportion of hydroxyl group (OH) in the whole terminal groups is from 5 to 50 mol %, and a ratio of the total mole number of branched structural units to one mole of a structural unit represented by the following formula (a) is from 0.1 to 0.8 mol %.

[Chem. 2]

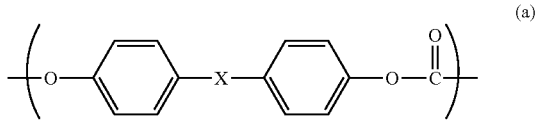

(a)

(In the formula (a), X represents a single bond, an alkylene group having from 1 to 8 carbon atoms, an alkylidene group having from 2 to 8 carbon atoms, a cycloalkylene group having from 5 to 15 carbon atoms, a cycloalkylidene group having from 5 to 15 carbon atoms, or a divalent group selected from the group consisting of —O—, —S—, —CO—, —SO— and —$SO_2$—.)

Advantage of the Invention

According to the present invention, in the production of an aromatic polycarbonate, eye boogers at the time of extrusion molding are reduced, and continuous operation for a long period of time is possible.

Figure 1:
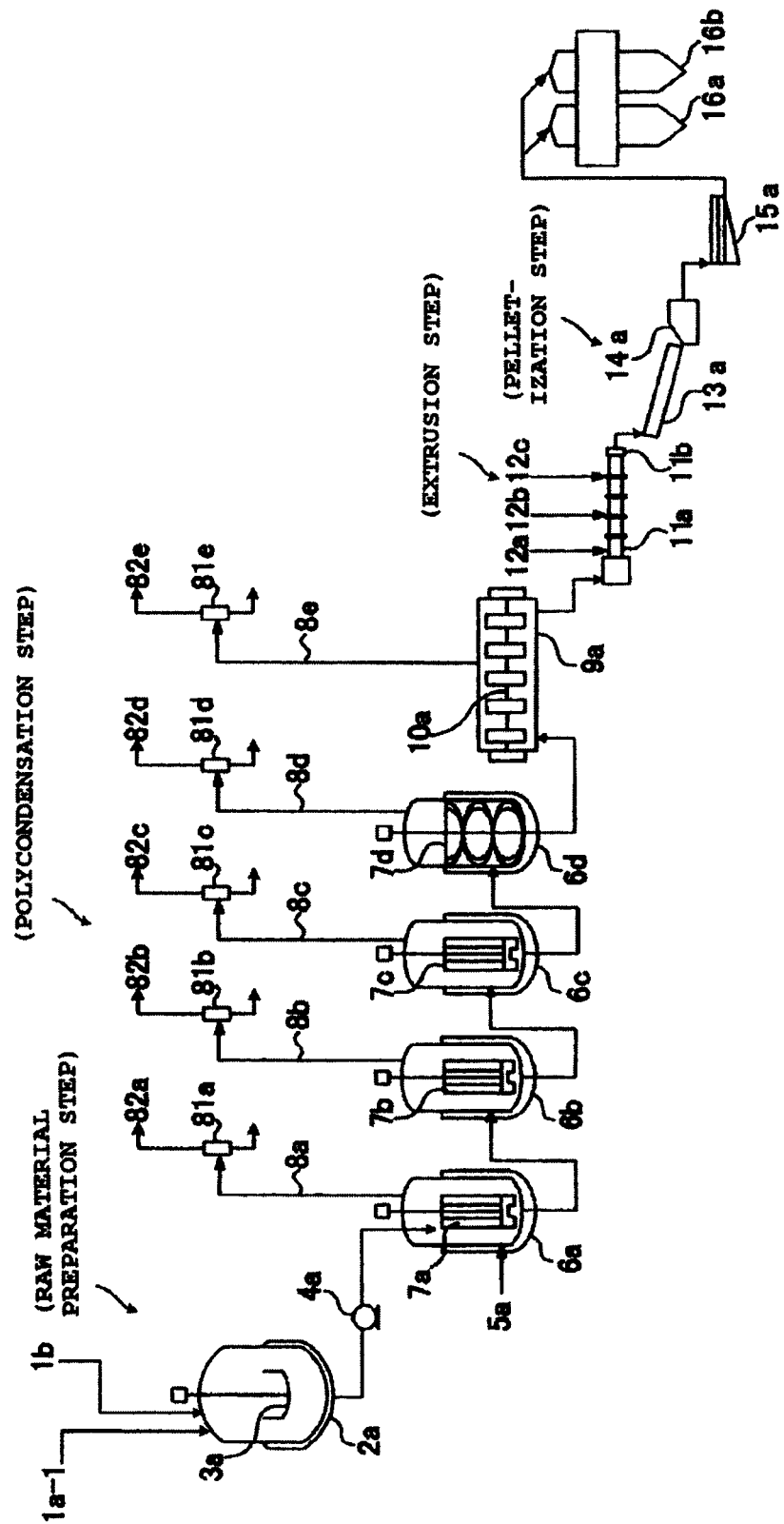
FIG. 1 is a view showing one example of the production apparatus of an aromatic polycarbonate.

DESCRIPTION OF REFERENCE NUMERALS AND SIGNS 1a-1 . . . DPC supply port
1b . . . BPA supply port
2a . . . First raw material mixing tank
3a . . . Anchor type stirring blade
4a . . . Raw material supply pump
5a . . . Catalyst supply port
6a . . . First vertical stirring reactor
6b . . . Second vertical stirring reactor
6c . . . Third vertical stirring reactor
6d . . . Fourth vertical stirring reactor
7a, 7b, 7c . . . MAXBLEND blade
7d . . . Helical ribbon blade
8a, 8b, 8c, 8d, 8e . . . Distillation pipe
9a . . . Fifth horizontal stirring reactor
10a . . . Stirring blade
11a . . . Extruder
11b . . . Die plate
12a, 12b, 12c . . . Additive supply port
13a . . . Strand cooling device
14a . . . Cutter
15b . . . Dehydrator
16a, 16b . . . Product silo
81a, 81b, 81c, 81d, 81e . . . Condenser
82a, 82b, 82c, 82d, 82e . . . Pressure reducing device
1 . . . Tapered part
2 . . . Die hole edge diameter
3 . . . Die hole inner diameter
4 . . . Edge of die hole outlet part
5 . . . Taper depth
9 . . . Die hole
10 . . . Die plate
L . . . Capillary length

BEST MODE FOR CARRYING OUT THE INVENTION

The best mode for carrying out the invention (hereinafter, the present embodiment) is described in detail below. The present invention is not limited to the following embodiments.
(Aromatic Polycarbonate)
In the present invention, the aromatic polycarbonate is not particularly limited as long as it is produced by any method of an interface method and a melting method.
In the following embodiment, a method of producing an aromatic polycarbonate by continuously conducting a melt polycondensation reaction using an aromatic dihydroxy compound and a carbonic diester as raw materials in the presence of an ester exchange catalyst is described below as one example.
(Aromatic Dihydroxy Compound)
The aromatic dihydroxy compound used in the present embodiment includes a compound represented by the following general formula (1).

[Chem. 3]

General Formula (1)

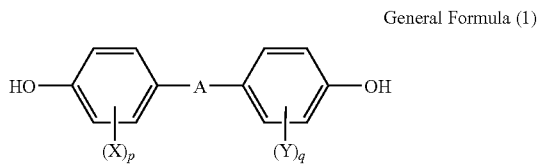

In the general formula (1), A represents a single bond, a straight-chain, branched or cyclic divalent hydrocarbon group having from 1 to 10 carbon atoms which may be substituted, or a divalent group represented by —O—, —S—, —CO— or —$SO_2$—. X and Y represent a halogen atom or a hydrocarbon group having from 1 to 6 carbon atoms. p and q are an integer of 0 or 1. X and Y, and p and q may be the same or different, respectively.
Specific examples of the aromatic dihydroxy compound include bisphenols such as bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromophenyl)propane, 4,4-bis(4-hydroxyphenyl)heptane and 1,1-bis(4-hydroxyphenyl)-cyclohexane; biphenols such as 4,4'-dihydroxybiphenyl and 3,3',5,5'-tetramethyl-4,4'-dihydroxybiphenyl; bis(4-hydroxyphenyl)sulfone, bis(4-hydroxyphenyl) sulfide, bis(4-hydroxyphenyl)ether, and bis(4-hydroxyphenyl)ketone.
Of those, 2,2-bis(4-hydroxyphenyl)propane ("bisphenol A", hereinafter sometimes abbreviated as "BPA") is preferred. Those aromatic dihydroxy compounds can be used alone or as mixtures of two or more thereof.
(Carbonic Diester)
The carbonic diester used in the present embodiment includes a compound represented by the following general formula (2)

[Chem. 4]

General Formula (2)

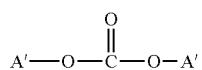

In the general formula (2), A' represents a straight-chain, branched or cyclic monovalent hydrocarbon group having from 1 to 10 carbon atoms which may be substituted. Two A's may be the same or different.

Specific examples of the carbonic diester include diphenyl carbonate, a substituted diphenyl carbonate such as ditolyl carbonate; dimethyl carbonate, diethyl carbonate and di-t-butyl carbonate.

Of those, diphenyl carbonate (hereinafter sometimes abbreviated as "DPC") and a substituted diphenyl carbonate are preferred. Those carbonic diesters can be used alone or as mixtures of two or more thereof.

The carbonic diester may be replaced by dicarboxylic acid or dicarboxylic ester in an amount of preferably 50 mol % or less, and more preferably 30 mol % or less.

The representative dicarboxylic acid or dicarboxylic ester includes terephthalic acid, isophthalic acid, diphenyl terephthalate and diphenyl isophthalate. When the carbonic diester is replaced by such a dicarboxylic acid or dicarboxylic ester, a polyester carbonate is obtained.

Those carbonic diesters (including the above replaced dicarboxylic acid or dicarboxylic ester, and hereinafter the same) are used in an amount excess to the dihydroxy compound.

Specifically, the carbonic diester is used in a molar ratio of generally from 1.01 to 1.30, and preferably from 1.02 to 1.20, to the aromatic dihydroxy compound. Where the molar ratio is smaller than 1.01, terminal OH group of the aromatic polycarbonate obtained is increased, and there is the tendency that thermal stability of a resin deteriorates. On the other hand, where the molar ratio is larger than 1.30, reaction rate of the ester exchange lowers, and it is difficult to produce an aromatic polycarbonate having the desired molecular weight. Additionally, residual amount of a carbonic diester in a resin is increased, and this may result in the cause of odor at the time of mold processing and odor of a molded article, which is not preferred.

(Ester Exchange Catalyst)

The ester exchange catalyst used in the present embodiment includes catalysts generally used in producing an aromatic polycarbonate by an ester exchange method, and is not particularly limited. In general, examples of the catalyst include basic compounds such as an alkali metal compound, a beryllium or magnesium compound, an alkaline earth metal compound, a basic boron compound, a basic phosphorus compound, a basic ammonium compound, and an amine compound.

Of those ester exchange catalysts, an alkali metal compound is practically desirable. Those ester exchange catalysts may be used alone or as mixtures of two or more thereof.

The ester exchange catalyst is used in a range of generally from $1 \times 10^{-9}$ to $1 \times 10^{-1}$ mol, and preferably from $1 \times 10^{-7}$ to $1 \times 10^{-2}$ mol, per mole of the aromatic dihydroxy compound.

The alkali metal compound includes inorganic alkali metal compounds such as hydroxides, carbonates and hydrogen carbonate compounds of alkali metals; and organic alkali metal compounds such as salts of alkali metals with alcohols, phenols or organocarboxylic acids. Examples of the alkali metal include lithium, sodium, potassium, rubidium and cesium.

Of those alkali metal compounds, a cesium compound is preferred, and cesium carbonate, cesium hydrogen carbonate and cesium hydroxide are particularly preferred.

Examples of the beryllium or magnesium compound and the alkaline earth metal compound include inorganic alkaline earth metal compounds such as hydroxides or carbonates of beryllium, magnesium and alkaline earth metals; and salts of those metals with alcohols, phenols and organocarboxylic acids. Examples of the alkaline earth metal include calcium, strontium and barium.

Examples of the basic boron compound include a sodium salt, a potassium salt, a lithium salt, a calcium salt, a magnesium salt, a barium salt and a strontium salt of a boron compound. Examples of the boron compound include tetramethyl boron, tetraethyl boron, tetrapropyl boron, tetrabutyl boron, trimethylethyl boron, trimethylbenzyl boron, trimethylphenyl boron, triethyl-methyl boron, triethylbenzyl boron, triethylphenyl boron, tributylbenzyl boron, tributylphenyl boron, tetraphenyl boron, benzyltriphenyl boron, methyltriphenyl boron and butyltriphenyl boron.

Examples of the basic phosphorus compound include trivalent phosphorus compounds such as triethylphosphine, tri-n-propylphosphine, triisopropylphosphine, tri-n-butylphosphine, triphenylphosphine and tributylphosphine; and quaternary phosphonium salts derived from those compounds.

Examples of the basic ammonium compound include tetramethylammonium hydroxide, tetraethylammonium hydroxide, tetrapropylammonium hydroxide, tetrabutyl-ammonium hydroxide, trimethylethylammonium hydroxide, trimethylbenzylammonium hydroxide, trimethylphenylammonium hydroxide, triethylmethylammonium hydroxide, triethyl-benzylammonium hydroxide, triethylphenylammonium hydroxide, tributylbenzylammonium hydroxide, tributylphenylammonium hydroxide, tetraphenylammonium hydroxide, benzyltriphenyl-ammonium hydroxide, methyltriphenylammonium hydroxide and butyltriphenylammonium hydroxide.

Examples of the amine compound include 4-amino-pyridine, 2-aminopyridine, N,N-dimethyl-4-aminopyridine, 4-diethylaminopyridine, 2-hydroxypyridine, 2-methoxy-pyridine, 4-methoxypyridine, 2-dimethylaminoimidazole, 2-methoxyimidazole, imidazole, 2-mercaptoimidazole, 2-methylimidazole and aminoquinoline.

(Production Method of Aromatic Polycarbonate)

A production method of an aromatic polycarbonate is described below.

The production of an aromatic polycarbonate is conducted by preparing an aromatic dihydroxy compound and a carbonic diester compound as raw materials (raw material preparation step) and subjecting those compounds to a multi-stage polycondensation reaction using plural reactors in the presence of an ester exchange reaction catalyst under a molten state (polycondensation step). The reaction method may be any of a batch method, a continuous method, and a combination of a batch method and a continuous method. The reactors used comprise plural vertical reactors and the subsequent at least one horizontal reactor. In general, those reactors are arranged in series, and treatment is conducted continuously.

After the polycondensation step, the reaction is stopped with a terminator in an extruder, unreacted raw materials and reaction by-products are removed, additives such as a heat stabilizer and a release agent are added (extrusion step), and a strand of an aromatic polycarbonate resin discharged from the extruder is cooled, and formed into pellets having a given particle size (pelletization step).

Each step of the production method is described below.

(Raw Material Preparation Step)

An aromatic dihydroxy compound and a carbonic diester used as raw materials of an aromatic polycarbonate are generally prepared as a molten mixture using a batch, semi-batch or continuous stirring tank type apparatus in an atmosphere of an inert gas such as nitrogen or argon. For example, in the case of using bisphenol A (BPA) as the aromatic dihydroxy compound and diphenyl carbonate (DPC) as the carbonic diester, the temperature of melt mixing is selected from a range of generally from 120 to 180° C., and preferably from 125 to 160° C.

In this case, proportions of the aromatic dihydroxy compound and the carbonic diester are adjusted such that the carbonic diester is excess, and are adjusted such that the carbonic diester is a proportion of generally from 1.01 to 1.30 mol, and preferably from 1.02 to 1.20 mol, per mole of the aromatic dihydroxy compound.

(Polycondensation Step)

Polycondensation by an ester exchange reaction between the aromatic dihydroxy compound and the carbonic diester is continuously conducted by a multi-stage step of generally 2 stages or more, and preferably from 3 to 7 stages. Specific reaction conditions are that temperature is in a range of from 150 to 320° C., pressure is in a range of from normal pressures to 0.01 Torr (1.3 Pa), and an average residence time is in a range of from 5 to 150 minutes.

In each reactor of a multi-stage step, further high temperature and further high vacuum are set stepwise within the above reaction conditions in order to further effectively discharge phenol by-produced with the progress of the polycondensation reaction. It is preferred to set to a temperature as low as possible and a residence time as short as possible to prevent deterioration of quality such as hue of the aromatic polycarbonate obtained.

In the case of the polycondensation of a multi-stage step, generally a plurality of vertical reactors equipped with a stirring blade are connected, and a horizontal reactor is provided as the final step, thereby increasing an average molecular weight of an aromatic polycarbonate. The vertical reactors provided are generally 2 to 5, and preferably 3 to 4.

The vertical reactor used herein means a reactor that an axis of rotation of a stirring blade is vertical (perpendicular direction). Shape of the vertical reactor is that a ratio (L/D) of length L of a straight body part to an inner diameter D of a reactor is 3 or less, and preferably 0.5 to 3.

Examples of the type of the stirring blade in the vertical reactor include a turbine blade, paddle blade, a pfaudler blade, an anchor blade, a FULLZONE blade (manufactured by Shinko Pantek Co., Ltd.), a sanmeler blade (manufactured by Mitsubishi Heavy Industries, Ltd.), a MAXBLEND blade (manufactured by Sumitomo Heavy Industries, Ltd.), a helical ribbon blade, and a lattice-type twisting blade (manufactured by Hitachi, Ltd.).

Furthermore, the horizontal reactor means a reactor that an axis of revolution of a stirring blade is horizontal (horizontal direction). Examples of the stirring blade in the horizontal reactor include single shaft stirring blades such as a disc type and a paddle type, and two-shaft stirring blades such as HVR, SCR, N-SCR (manufactured by Mitsubishi Heavy Industries, Ltd.), Bivolac (manufactured by Sumitomo Heavy Industries, Ltd.), a spectacle-shaped blade and a lattice-type blade (manufactured by Hitachi, Ltd.).

The ester exchange catalyst used in polycondensation between the aromatic dihydroxy compound and the carbonic diester is generally previously provided as an aqueous solution. Concentration of the catalyst aqueous solution is not particularly limited, and is adjusted to an optional concentration according to solubility of a catalyst in water. Other solvent such as acetone, alcohol, toluene or phenol can be selected in place of water.

Properties of water used for dissolution of the catalyst are not particularly limited as long as the kind and concentration of impurities contained are constant. In general, distilled water, deionized water and the like are preferably used.

(Extrusion Step)

After the polycondensation step, unreacted raw materials in a molten reactant, an ester exchange catalyst, a hydroxy compound by-produced in an ester exchange reaction, and a low molecular weight compound such as an aromatic polycarbonate oligomer are removed in an extrusion step. This removal is generally conducted continuously by a vented extruder.

The extruder used is not particularly limited. Examples of the extruder include vented single-screw or multi-screw extruders. In particular, a mating type twin-screw extruder is preferred. Rotating direction of the axis of the extruder may be the same direction rotation or the different direction rotation. The number of vent is generally multiple vents of from 2 to 10.

In the extrusion step, it is preferred to neutralize and deactivate the residual basic ester exchange catalyst in the aromatic polycarbonate after the polycondensation reaction with an acidic compound or its derivatives. This can suppress a side-reaction in the extruder, and remove residual unreacted raw materials and hydroxy compound.

(Pelletization Step)

The strand-shaped aromatic polycarbonate discharged from the extruder in the extrusion step generally passes through a strand bath and is pelletized by a strand cutter. Thereafter, the pellets obtained are subjected to water removal by a dehydrator or the like, and then placed in a product silo.

(Production Apparatus)

One example of the production method of an aromatic polycarbonate to which the present embodiment is applied is specifically described below based on the drawings.

FIG. 1 is a view showing one example of a production apparatus of an aromatic polycarbonate. In the production apparatus shown in FIG. 1, an aromatic polycarbonate is produced through a raw material preparation step which prepares an aromatic dihydroxy compound and a carbonic diester as raw materials, and a polycondensation step which conducts a polycondensation reaction of those raw materials in a molten state using plural reactors. Thereafter, pellets of the aromatic polycarbonate are formed through an extrusion step in which unreacted raw materials and reaction by-products in a molten reactant are removed and optional additives are added, followed by melt kneading, and a pelletization step.

A first raw material mixing tank $2a$ and a raw material supply pump $4a$ for supplying the raw materials prepared to a polycondensation step are provided in the raw material preparation step. For example, an anchor type stirring blade $3a$ is provided in the raw material mixing tank $2a$.

Furthermore, to the raw material mixing tank $2a$, diphenyl carbonate (DPC) as the carbonic diester is supplied in a molten state from a DPC supply port $1a$-$1$, and bisphenol A (BPA) as the aromatic dihydroxy compound is supplied in a powder state from a BPA supply port $1b$. As a result, bisphenol A (BPA) is melted in a molten diphenyl carbonate (DPC).

A first vertical stirring reactor 6a, a second vertical stirring reactor 6b, a third vertical stirring reactor 6c and a fourth vertical stirring reactor 6d which are connected in series, and a fifth horizontal stirring reactor 9a connected to the subsequent stage of the fourth vertical stirring reactor 6d in series are provided in the polycondensation step. MAXBLEND blades 7a, 7b and 7c are provided in the first vertical stirring reactor 6a, the second vertical stirring reactor 6b and the third vertical stirring reactor 6c, respectively. A helical ribbon blade 7d is provided in the fourth vertical stirring reactor 6d. Furthermore, a stirring blade 10a is provided in the fifth horizontal stirring reactor 9a.

Distillation pipes 8a, 8b, 8c, 8d and 8e for discharging by-products or the like formed by polycondensation reaction are fitted to five reactors, respectively. The distillation pipes 8a, 8b, 8c, 8d and 8e are connected to condensers 81a, 81b, 81c 81d and 81e, respectively, and each reactor is maintained in a given reduced pressure state by pressure reducing devices 82a, 82b, 82c, 82d and 82e.

An extruder 11a having additive supply ports 12a, 12b and 12c is provided in the extrusion step.

A strand cooling device 13a which cools a strand-shaped aromatic polycarbonate discharged from a die plate 11b fitted to the tip of the extruder 11a, a cutter 14a which cuts the cooled strand into a given particle size, a dehydrator 15a for removing water in pellets, and product silos 16a and 16b which store dried pellets are provided in the pelletization step.

In the present embodiment, the aromatic polycarbonate supplied to the extruder 11a in a molten state is extruded into a strand shape from a die hole outlet of the die plate 11b fitted to an outlet of the extruder 11a. In this case, it is necessary that a shear rate ($\gamma$) at the outlet of the extruder 11a is in a range of from 100 to 500 sec$^{-1}$, and a shear stress ($\tau$) is in a range of from 50 to 200 kPa.

The shear rate ($\gamma$) and shear stress ($\tau$) of an aromatic polycarbonate are generally calculated based on the following equations.

Shear rate($\gamma$)(sec$^{-1}$)=32$Q/\pi D^3/h$

Shear stress($\tau$)(kPa)=$\tau \cdot \gamma$/1000

In the equations, Q is a volume velocity (m$^3$/sec) of an aromatic polycarbonate, D is a die hole edge hole diameter (m) of a die hole outlet formed on the die plate 11b, h is the number of holes formed in the die plate 11b, and $\mu$ is an apparent viscosity (Pa·S) of an aromatic polycarbonate. The apparent viscosity (Pa·S) was obtained such that the correlations between melt viscosity and temperature, and between melt viscosity and shear rate on the aromatic polycarbonate used are measured with a capillorheometer (L/D=10/1), and the corresponding melt viscosity value is estimated from the shear rate calculated by the above equation and a resin temperature at a die hole outlet.

In the present embodiment, when extrusion molding is conducted such that the shear rate ($\gamma$) at the outlet of the extruder 11a and the shear stress ($\tau$) are fallen within the above-described ranges, deteriorated materials generally called eye boogers are greatly reduced from being adhered on the outlet of a given number of die holes provided on the die plate 11b.

The shear rate ($\gamma$) at the outlet of the extruder 11a is affected by a volume velocity of an aromatic polycarbonate, that is, a production rate, and a diameter of the die hole from the above equation. Where the shear rate ($\gamma$) is excessively small, discharge flow rate at the die hole outlet is extremely dropped, and take-off stability of a strand tends to deteriorate. On the other hand, where the shear rate ($\gamma$) is excessively large, there is the tendency that it is difficult to control a resin temperature by temperature rise due to shear heat generation, and the shape of pellets obtained is liable to be nonuniform by insufficient cooling of the strand.

Furthermore, the shear stress ($\tau$) at the outlet of the extruder 11a is not always unequivocally determined if the shear rate ($\gamma$) is determined, and is also affected by a melt viscosity of a resin. In other words, when a resin temperature according to a viscosity (molecular weight) of an aromatic polycarbonate is adjusted to an appropriate range, the advantage of the present invention can be achieved further properly. Where the shear stress ($\tau$) is excessively small, foaming phenomenon and decomposition of a resin, and resin scorch tend to occur. On the other hand, where the shear stress ($\tau$) is excessively large, there is the tendency that the die hole outlet is liable to be clogged, and it is difficult to conduct stable operation.

The preferred embodiment of the die plate 11b fitted to three vent holes of the extruder 11a is described below.

Figure 2:
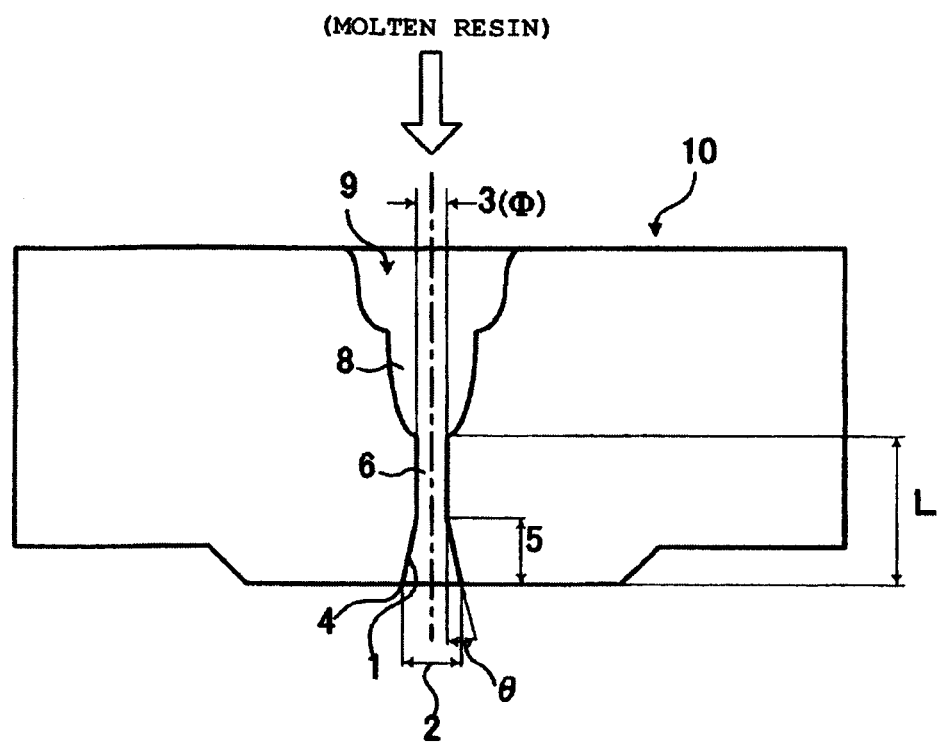
FIG. 2 is a view for explaining a vertical cross-section of a die hole outlet part in the present embodiment.

FIG. 2 is a view for explaining a vertical cross section of a die hole outlet part in the present embodiment. A die plate 10 shown in FIG. 2 comprises plural circular pipe-shaped die holes 9, and a molten resin is supplied to the die hole 9 from the upper part of FIG. 2. The die hole 9 comprises an opening part 8 having an inner diameter reduced in two stages at the upper portion of the die plate 11b, a capillary part 6 formed with a constant inner diameter (die hole inner diameter 3 ($\Phi$)) toward the die hole outlet part from the lower end of the opening part 8, and a tapered part 1 having a given die hole edge diameter 2, a given half apex angle ($\theta$) and a taper width 5 at the die hole outlet part on the lower portion of the die plate 11b. As shown in FIG. 2, when the tapered part 1 is formed at the die hole outlet part, an edge 4 at the die hole outlet part is formed wider than the die hole inner diameter 3 ($\Phi$). Furthermore, a height L of from the bottom of the die plate 10 to the lower end portion of the opening part 8 of the die hole 9 is defined as a capillary length.

The half apex angle ($\theta$) of the tapered part 1 is preferably from 4 to 20°. Where the half apex angle ($\theta$) is excessively small, the effect for restraining generation of eye boogers is insufficient. Where the half apex angle ($\theta$) is excessively large, there is the tendency that when cleaning the edge 4, a resin accumulates, and is liable to be scorched.

The taper depth 5 of the tapered part 1 is generally adjusted in a range that the die hole edge diameter 2 is 1.05 to 1.3 times the die hole inner diameter 3. Where the taper depth 5 of the tapered part 1 is excessively small, the effect for restraining generation of eye boogers may be insufficient. Where the taper depth 5 is excessively large and exceeds the maximum diameter of the strand at the time of a Barus effect, a gap is generated between a die and a resin, and there is the tendency that when cleaning the edge 4, a resin accumulates, and is liable to be scorched.

The shape of an inlet part of the die hole 9 may be the known shape, and may not have a taper. The shape of an inlet part of the die hole 9 is determined in consideration with prevention of generation of melt fracture (defective phenomenon of film surface). The material of the die plate 10 used is generally a stainless steel (SUS304 and the like), a tool steel (iron alloy containing from 11 to 13% of Cr, and from 0.8 to 1.2% of Mo), and the like.

The number and arrangement of die holes 9 formed in the die plate 10 can be determined according to a size of pellets, the shear rate ($\gamma$) in the die hole 9, and the like. The preferred arrangement of plural die holes 9 formed in the die plate 10 is described below.

Figure 3:
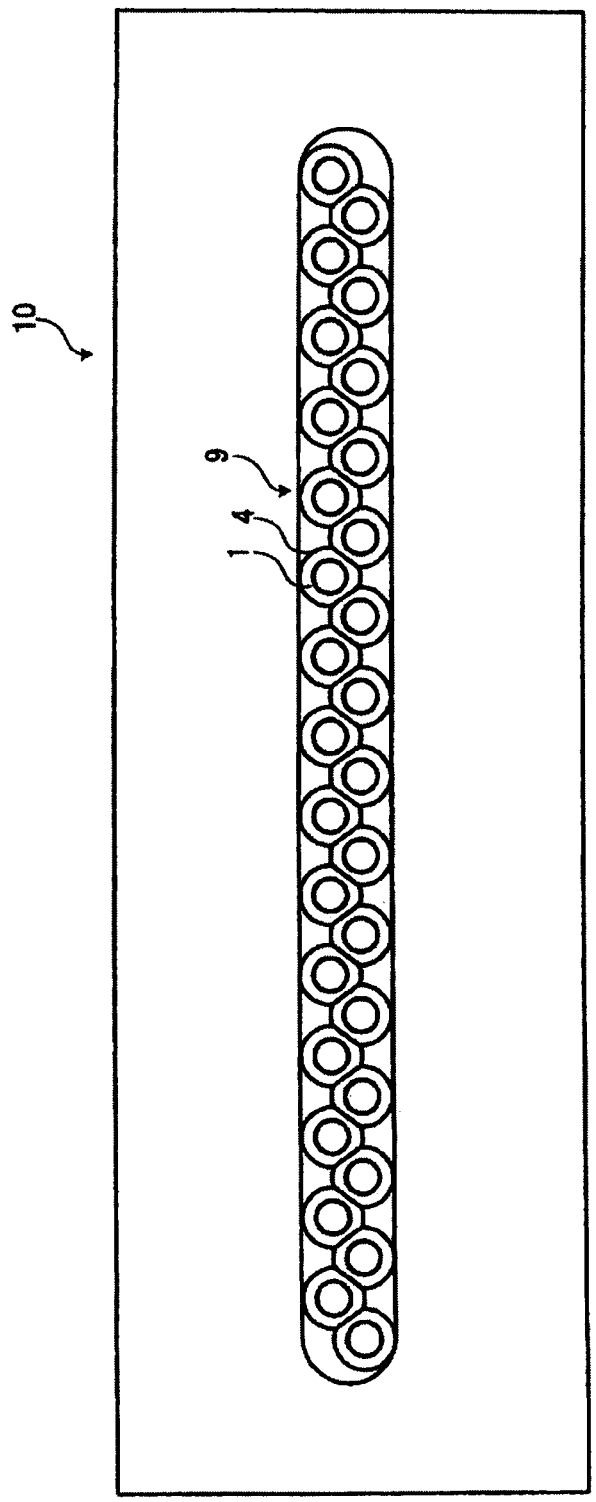
FIG. 3 is a view for explaining a preferred arrangement of die holes in the present embodiment.

FIG. 3 is a view for explaining the preferred arrangement of die holes in the present embodiment. FIG. 3 shows the structure at a resin discharge surface side of the die plate 10. As shown in FIG. 3, thirty die holes 9 formed at the resin discharge surface side of the die plate 10 are alternately arranged such that neighboring two die holes 9 are mutually deviated in a vertical direction and a horizontal direction to an extent of a radius length, respectively, and constitutes a stagger-shaped arrangement which forms a dense filling as a whole.

The strand-shaped aromatic polycarbonate discharged from the extruder 11*a* is passed through a strand cooling device 13*a*, and pelletized with a cutter 14*a*. After removing water with a dehydrator 15*a*, the pellets are introduced into product silos 16*a* and 16*b*.

It is preferred that the aromatic polycarbonate produced in the present embodiment has a viscosity average molecular weight (Mv) of 13,000 or more. Where the viscosity average molecular weight (Mv) is excessively low, there is the tendency that mechanical strength such as impact resistance is decreased.

It is preferred that the proportion of hydroxyl group (OH) in the whole terminal groups of the aromatic polycarbonate is in a range of from 5 to 50 mol %. Where the proportion of the hydroxyl group (OH) is excessively small, there is the tendency that hue of the aromatic polycarbonate obtained deteriorates. On the other hand, where the proportion of the hydroxyl group (OH) is excessively large, heat stability of the aromatic polycarbonate tends to deteriorate.

Furthermore, it is preferred that the aromatic polycarbonate produced in the present embodiment has a ratio of the total mole number of branched structural units to one mole of a structural unit represented by the following formula (a) (degree of branching, unit: molds) in a range of from 0.1 to 0.8 mol %. When the degree of branching is fallen within the above range, a melt tension is high, blow molding is good, and there is the tendency that a product having good heat stability and hue is obtained.

Examples of the branched structural unit typically include the structures represented by the following formulae (b) to (e).

[Chem. 5]

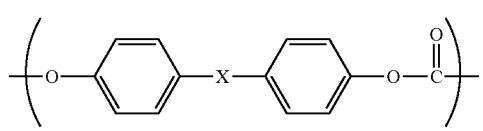
(a)

[Chem. 6]

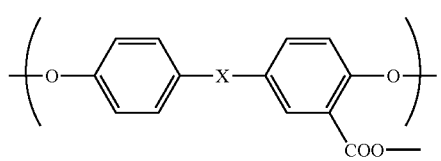
(b)

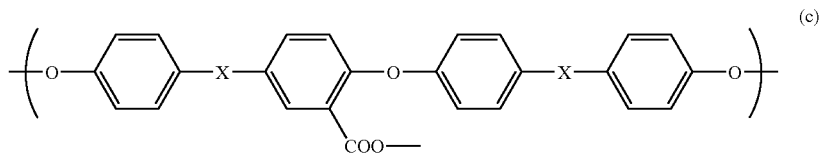
(c)

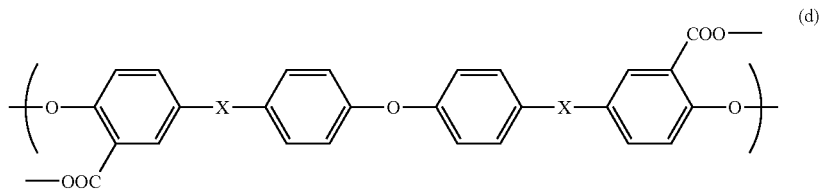
(d)

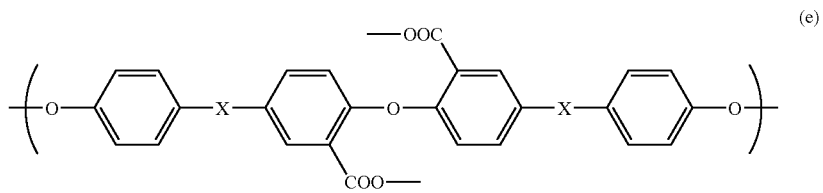
(e)

In the formulae (a) and (b) to (e), X represents a single bond, an alkylene group having from 1 to 8 carbon atoms, an alkylidene group having from 2 to 8 carbon atoms, a cycloalkylene group having from 5 to 15 carbon atoms, a cycloalkylidene group having from 5 to 15 carbon atoms, or a divalent group selected from the group consisting of —O—, —S—, —CO—, —SO— and —SO$_2$—.

The ratio of the total mole number of branched structural units represented by the above formulae (b) to (e) to one mole of a structural unit represented by the above formula (a) (degree of branching) is obtained based on the amount of each different kind of structural units measured with high performance liquid chromatography (HPLC), gel permeation chromatography (GPC) and the like after alkali hydrolysis of the aromatic polycarbonate produced.

For example, when bisphenol A (BPA) is used as an aromatic dihydroxy compound, the structural units represented by the above formulae (a) and (b) to (e) are detected as the compounds of the following formulae (f) to (j), respectively, in high performance liquid chromatography (HPLC) and the like after alkali hydrolysis of the aromatic polycarbonate, and therefore can be quantitatively determined from an absorbance index of a standard material of each compound.

[Chem. 7]

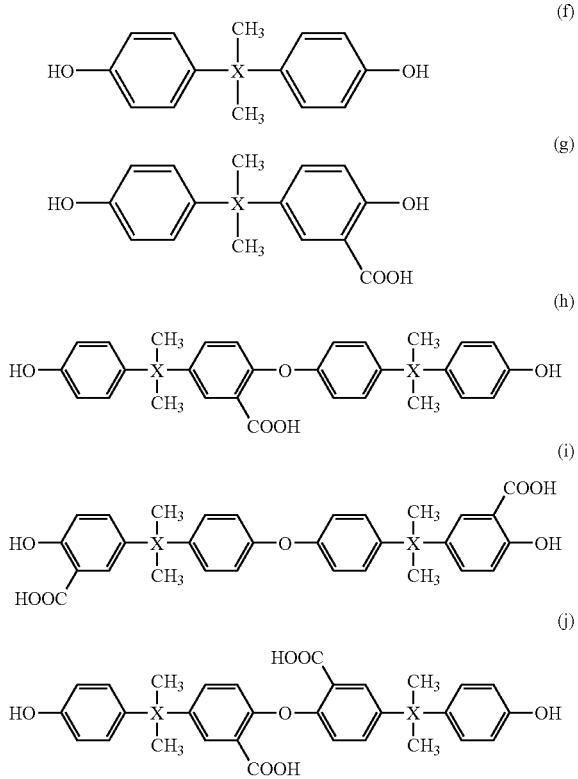

Specifically, calibration curves of concentration and peak area are prepared using a standard material of each compound, and each content is quantitatively determined.

The present invention is described further specifically based on the Examples. However, the present invention is not limited to the following Examples so far as it does not depart from its gist.

(1) Viscosity Average Molecular Weight (Mv) of Aromatic Polycarbonate

A viscosity average molecular weight (Mv) of an aromatic polycarbonate was obtained from the following equations by measuring a limited viscosity [η] at 20° C. in methylene chloride using Ubbellohde viscometer.

$$\eta_{sp}/C = [\eta] \times (1 + 0.281\eta_{sp})$$

$$[\eta] = 1.23 \times 10^{-4} \times (Mv)^{0.83}$$

(In the equations, $\eta_{sp}$ is a specific viscosity of a methylene chloride solution of an aromatic polycarbonate measured at 20° C., and C is a concentration of this methylene chloride solution. The methylene chloride solution used has an aromatic polycarbonate concentration of 0.6 g/dl.)

(2) Proportion of Hydroxyl Group (OH) in Whole Terminal Groups of Aromatic Polycarbonate The proportion of hydroxyl group (OH) in the whole terminal groups of an aromatic polycarbonate (hereinafter sometimes referred to as "terminal hydroxyl group concentration") (unit: mol %) was obtained by dissolving 0.02 g of a sample in 0.4 ml of chloroform containing deuterium, measuring the number of terminal hydroxyl groups (μeq/g) and the number of terminal phenyl groups (μeq/g) at 30° C. using $^1$H-NMR (JNM-A1400, a product of JEOL Co., Ltd.), and calculating a terminal hydroxyl group concentration (mol %) by the following equation.

Terminal hydroxyl group concentration(mol %)= (Number of terminal hydroxyl groups)/(Number of terminal hydroxyl groups+number of terminal phenyl groups)×100

(3) Degree of Branching (Unit: Mol %)

The degree of branching of an aromatic polycarbonate is expressed by a ratio (mol %) of the total mole number of the branched structural units represented by the above-described formulae (b) to (e) to one mole of the structural unit represented by the above-described formula (a).

Specifically, the content of each structural unit was obtained by calculating a ratio (mol %) of the mole number of the respective structural units represented by the formulae (g) to (j) to one mole of the structural unit represented by the formula (f) based on the measurement described below.

First, 1 g of an aromatic polycarbonate (sample) was dissolved in 100 ml of methylene chloride, and 18 ml of a 28% sodium methoxide methanol solution and 80 ml of methanol were added thereto. 25 ml of pure water was added to the resulting mixture, followed by stirring at room temperature for 2 hours, thereby completely hydrolyzing.

Thereafter, 1N hydrochloric acid was added to the above solution to neutralize, and a methylene chloride layer was separated to obtain a hydrolyzate.

Next, 0.05 g of the above hydrolyzate was dissolved in 10 ml of acetonitrile, and measurement was conducted using negative phase high performance liquid chromatography (HPLC).

The negative phase high performance liquid chromatography (HPLC) used a mixed solvent comprising acetonitrile and 10 mM of an ammonium acetate aqueous solution as an elute, and measurement was conducted at a column temperature of 40° C. under the condition that an acetonitrile/10 mM ammonium acetate aqueous solution ratio is changed starting from (20/80) and ending to (80/20). Detection was conducted using UV detector of wavelength of 280 nm (SPD-6A, a product of Shimadzu Corporation).

The structural units represented by the above-described formulae (a) to (e) are detected as the compounds of the formulae (f) to (j). The structural unit was identified using LC-MS (Agilent-1100, a product of Agilent) and NMR (AL-400, a product of JEOL Co., Ltd.). Furthermore, regarding the content of each structural unit, a calibration curve (concentration/peak area) was prepared using a standard material of each compound, and the content of each structural unit was quantitatively determined.

(4) Shear Rate ($\gamma$) and Shear Stress ($\tau$)

Shear rate ($\gamma$) and shear stress ($\tau$) of an aromatic polycarbonate were calculated based on the following equations, respectively.

Shear rate($\gamma$)(sec$^{-1}$)=32$Q/\pi D^3/h$

Shear stress($\tau$)(kPa)=$\mu\cdot\gamma$/1000

In the formulae, Q is a volume velocity (m$^3$/sec), D is an edge hole diameter (m) at a die plate outlet, h is the number of holes in a die plate, and $\mu$ is an apparent viscosity (Pa·S).

The apparent viscosity (Pa·S) was obtained by that the correlations between melt viscosity and temperature, and between melt viscosity and shear rate on the aromatic polycarbonate used are previously measured with a capillorheometer (L/D=10/1), and the corresponding melt viscosity value is estimated from the shear rate ($\gamma$) calculated by the above formula and a resin temperature at a die hole outlet.

Aromatic Polycarbonate

Synthesis Example 1

Melting Method

An aromatic polycarbonate was synthesized by the continuous production apparatus shown in FIG. 1 under the following conditions.

First, in a raw material preparation step, diphenyl carbonate (DPC) and bisphenol A (BPA) were mixed in a constant molar ratio (DPC/BPA=1.040) and heated to 140° C. in a nitrogen gas atmosphere to prepare a molten mixture of raw materials.

Next, the inside of a first vertical stirring reactor 6a having a volume of 100 liters was controlled to 220° C. and 1.33×10$^4$ Pa.

Subsequently, the molten mixture of raw materials was continuously supplied to the first vertical stirring reactor 6a through a raw material introduction pipe at a flow rate of 88.7 kg/hr, and the liquid level was maintained constant while controlling the opening of a valve (not shown) provided in a polymer discharge line at the bottom such that an average residence time is 60 minutes.

Simultaneously with starting the supply of the molten mixture of raw materials, a cesium carbonate aqueous solution as a catalyst was continuously supplied to the first vertical stirring reactor 6a from a catalyst supply port 5a in a proportion of 0.6 µmol per mole of BPA (1.2 µmol in terms of metal amount per mole of BPA).

A molten reactant discharged from the bottom of the first vertical stirring reactor 6a was continuously supplied to a second vertical stirring reactor 6b, a third vertical stirring reactor 6c, a fourth vertical stirring reactor 6d and a fifth horizontal stirring reactor 9a, successively, and a polymer withdrawn from the bottom of the fifth horizontal stirring reactor is held in a tank in a molten state.

The second vertical stirring reactor 6b, the third vertical stirring reactor 6c and the fourth vertical stirring reactor 6d each have a volume of 100 liters, and the fifth horizontal stirring reactor 9a has a volume of 150 liters.

The polycondensation reaction conditions (inner temperature, degree of vacuum and number of stirring) in the second vertical stirring reactor 6b to fifth horizontal stirring reactor 9a were set as follows so as to be high temperature, high vacuum and low stirring rate with the progress of the polycondensation reaction.

Second vertical stirring reactor 6b
(220° C., 13,300 Pa, 110 rpm)
Third vertical stirring reactor 6c
(240° C., 1,995 Pa, 75 rpm)
Fourth vertical stirring reactor 6d
(260° C., 67 Pa, 75 rpm)
Fifth horizontal stirring reactor 9a
(260° C., 67 Pa, 5 rpm)

During the polycondensation reaction, the liquid level in each reactor was controlled such that an average residence time in the second vertical stirring reactor 6b to fifth horizontal stirring reactor 9a is 60 minutes. Furthermore, phenol by-produced simultaneously with the polycondensation reaction was distilled away.

The aromatic polycarbonate obtained (P-1) had a viscosity average molecular weight (Mv) of 15,300, a terminal hydroxyl group concentration (OH) of 9.5 mol %, and the degree of branching of 0.23 mol %.

Synthesis Example 2

Melting Method

An aromatic polycarbonate was synthesized by setting to the same conditions as in Synthesis Example 1, except that the molar ratio (DPC/BPA) of diphenyl carbonate (DPC) to bisphenol A (BPA) is 1.04, the cesium carbonate aqueous solution (catalyst) is 1.6 µmol per mole of BPA, and the temperatures of the fourth vertical stirring reactor 6d and the fifth horizontal stirring reactor 9a are 270° C. and 280° C., respectively.

The aromatic polycarbonate obtained (P-2) had a viscosity average molecular weight (Mv) of 21,200, a terminal hydroxyl group concentration (OH) of 13.7 mol %, and the degree of branching of 0.31 mol %.

Synthesis Example 3

Melting Method

An aromatic polycarbonate was synthesized by setting to the same conditions as in Synthesis Example 2, except that the cesium carbonate aqueous solution (catalyst) is 0.8 µmol per mole of BPA.

The aromatic polycarbonate obtained (P-3) had a viscosity average molecular weight (Mv) of 25,800, a terminal hydroxyl group concentration (OH) of 33.8 mol %, and the degree of branching of 0.45 mol %.

Synthesis Example 4

Interface Method 16.31 kg/hr of BPA, 5.93 kg/hr of sodium hydroxide and 101.1 kg/hr of water were dissolved in the presence of 0.018 kg/hr of hydrosulfite at 35° C., and then cooled to 25° C. to prepare an aqueous phase. Next, an organic phase of 68.0 kg/hr of methylene chloride cooled to 5° C. was prepared. The aqueous phase and the organic phase were supplied to a stainless steel-made piping (inner diameter: mm, outer diameter: 8 mm) and mixed therein. The resulting mixture was emulsified using a homomixer (product name: T.K Homomix Line Flow LF-500 Model, a product of Tokushukika Co.) to prepare an emulsion of an aqueous solution of BPA sodium (BPA-Na) salt (aqueous phase) and methylene chloride (organic phase).

Next, the emulsion thus obtained was taken out of the homomixer by a piping (inner diameter: 6 mm, outer diameter: 8 mm) branched from the homomixer, and contacted with 7.5 kg/hr of liquefied phosgene supplied from a pipe cooled to 0° C. separately introduced into a pipe reactor, in the pipe reactor (made of Teflon (registered trade mark), inner diameter: 6 mm, length: 34 m) connected to the piping.

Phosgene reaction and oligomerization reaction were conducted during passing the emulsion and the liquefied phosgene through the pipe reactor at a linear velocity of 1.7 m/sec for 20 seconds while contacting those. In this case, the reaction temperature was adjusted so as to be 60° C., respectively, and each was externally cooled to 35° C. before introducing into a next oligomerization tank.

An oligomerized emulsion obtained from the pipe reactor as above was introduced into a reaction tank (oligomerization tank) having an inner volume of 50 liters equipped with a stirring machine, and stirred at 30° C. in a nitrogen gas atmosphere. By further oligomerizing, unreacted BPA-Na present in the aqueous phase was completely consumed, and the aqueous phase and the organic phase were separated by still standing, thereby obtaining a methylene chloride solution of an oligomer.

In oligomerizing, 0.005 kg/hr of triethylamine (catalyst) and 0.42 kg/hr of p-t-butylphenol (molecular weight modifier) were introduced into the oligomerization tank.

Subsequently, 23 kg of a methylene chloride solution of the oligomer prepared was charged in a reaction tank having an inner volume of 70 liters equipped with a pfaudler blade. To the reaction tank, 10 kg of methylene chloride for dilution was added, and 2.2 kg of a 25 wt % sodium hydroxide aqueous solution, 6 kg of water and 2.2 kg of triethylamine were further added. The resulting mixture was stirred at 30° C. in a nitrogen gas atmosphere to conduct polycondensation reaction for 60 minutes, thereby synthesizing an aromatic polycarbonate.

Next, 30 kg of methylene chloride and 7 kg of water were added to the molten reactant, followed by stirring for 20 minutes. The stirring was stopped, and the aqueous phase and the organic phase were separated. 20 kg of 0.1N hydrochloric acid was added to the organic phase separated, followed by stirring for 15 minutes. After extracting triethylamine and a small amount of a residual alkali component, the stirring was stopped, and the aqueous phase and the organic were separated.

20 kg of pure water was added to the organic phase separated, followed by stirring for 15 minutes. The stirring was stopped, and the aqueous phase and the organic phase were separated. This operation was repeated (three times) until chlorine ion in the extracted waste water is not detected.

The purified aromatic polycarbonate solution obtained was powdered with a kneader. After drying, granular powder (flake) was obtained.

The aromatic polycarbonate obtained (P-4) had a viscosity average molecular weight (Mv) of 21,000, a terminal hydroxyl group concentration (OH) of 1.4 mol %, and the degree of branching of 0 molds.

Synthesis Example 5

Interface Method

An aromatic polycarbonate was synthesized under the same conditions as in Synthesis Example 4, except that p-t-butylphenol (molecular weight modifier) is 0.27 kg/hr.

The aromatic polycarbonate obtained (P-5) had a viscosity average molecular weight (Mv) of 31,000, a terminal hydroxyl group concentration (OH) of 1.3 mol %, and the degree of branching of 0 mol %.

Example 1

Particulates of the aromatic polycarbonate (P-4) previously synthesized were introduced into a twin-screw extruder (a product of Kobe Steel, Ltd., screw diameter: 0.046 m, L/D=36) in a rate of 50 kg/hr, extrusion molded while controlling such that a resin temperature at a die outlet is 300° C., and pelletized.

The twin-screw extruder is provided with a die plate having 17 die holes 9 having a schematic cross section shown in FIG. 2 (arranged in staggered shape), and three vent holes.

The die hole 9 has an inner diameter ($\Phi$) of 3.0 mm and a capillary length (L) of 13 mm. A taper (half apex angle ($\theta$): 10°, depth: 1.4 mm, edge diameter: 3.5 mm) is formed at the tip of the die hole 9.

When extrusion molding was conducted under the above conditions, the molding extrusion could be operated by 103 hours without generation of eye boogers. During the operation, the shear rate ($\gamma$) was 181 [$sec^{-1}$], and the shear stress ($\tau$) was 107 [kPa].

Example 2

The aromatic polycarbonate (P-1) previously synthesized was introduced in a molten state into a twin-screw extruder (a product of Kobe Steel, Ltd., screw diameter: 0.046 m, L/D=36), and 5 ppm of butyl p-toluenesulfonate was added thereto. The resulting molten mixture was extrusion molded while hydrogenating and devolatilizing, and pelletized.

The twin-screw extruder does not form a taper at a die hole outlet part and is provided with a die plate having 17 die holes 9 (inner diameter ($\Phi$): 3.8 mm, capillary length (L): 15 mm) having a rectangular edge (arranged in series), and three vent holes.

When extrusion molding was conducted under the above conditions, the molding extrusion could be operated by 60 hours without generation of eye boogers. During the operation, the shear rate ($\gamma$) was 454 [$sec^{-1}$], and the shear stress ($\tau$) was 60 [kPa].

Example 3

The aromatic polycarbonate (P-2) previously synthesized was introduced in a molten state into a twin-screw extruder equipped with the die as used in Example 1, and 5 ppm of butyl p-toluenesulfonate was added thereto. The resulting molten mixture was extrusion molded while hydrogenating and devolatilizing, and pelletized.

The twin-screw extruder used is provided with a die plate having 17 die holes 9 (arranged in staggered shape), and three vent holes. The die hole 9 has an inner diameter ($\Phi$) of 3.0 mm and a capillary length (L) of 13 mm. A taper (half apex angle ($\theta$): 10°, depth: 1.4 mm, edge diameter: 3.5 mm) is formed at the tip of the die hole 9.

When extrusion molding was conducted under the above conditions, the molding extrusion could be operated by 74 hours without generation of eye boogers. During the operation, the shear rate ($\gamma$) was 154 [$sec^{-1}$], and the shear stress ($\tau$) was 180 [kPa].

Example 4

The aromatic polycarbonate (P-3) previously synthesized was introduced in a molten state into the same twin-screw extruder equipped with a die plate as in Example 3, and 5 ppm of butyl p-toluenesulfonate was added thereto. The resulting molten mixture was extrusion molded while hydrogenating and devolatilizing, and pelletized.

When extrusion molding was conducted under the above conditions, the molding extrusion could be operated by 79 hours without generation of eye boogers. During the operation, the shear rate (γ) was 454 [sec$^{-1}$], and the shear stress (τ) was 118 [kPa].

Comparative Example 1

The aromatic polycarbonate (P-1) was introduced in a molten state into a twin-screw extruder (a product of Kobe Steel, Ltd., screw diameter: 0.046 m, L/D=36) provided with a die plate having 17 die holes (inner diameter (Φ): 2.4 mm, capillary length (L): 11 mm) which each do not have a taper at an outlet part and have a rectangular edge (arranged in series), and three vent holes, and 5 ppm of butyl p-toluenesulfonate was added thereto. The resulting molten mixture was extrusion molded while hydrogenating and devolatilizing, and pelletized.

When extrusion molding was conducted under the above conditions, many eye boogers were generated in 4 hours. During the operation, the shear rate (γ) was 1,801 [sec$^{-1}$], and the shear stress (τ) was 233 [kPa].

Comparative Example 2

Granulates of the aromatic polycarbonate (P-5) previously synthesized were introduced into a twin-screw extruder equipped with a die plate having 17 die holes (arranged in series) each having a taper (half apex angle (θ): 5°, depth: 1.0 mm, edge diameter: 2.4 mm) formed at the tip thereof, and 5 ppm of butyl p-toluenesulfonate was added thereto. The resulting mixture was extrusion molded while hydrogenating and devolatilizing, and pelletized.

When extrusion molding was conducted under the above conditions, many eye boogers were generated in 6 hours. During the operation, the shear rate (γ) was 338 [sec$^{-1}$], and the shear stress (τ) was 352 [kPa].

Comparative Example 3

The aromatic polycarbonate (P-1) resin previously synthesized was introduced in a molten state into a twin-screw extruder equipped with a die plate having 17 die holes (arranged in staggered shape) each having a taper (half apex angle (θ): 15°, depth: 1.5 mm, edge diameter: 3.8 mm) formed at the tip thereof, and 5 ppm of butyl p-toluenesulfonate was added thereto. The resulting molten mixture was extrusion molded while hydrogenating and devolatilizing, and pelletized.

When extrusion molding was conducted under the above conditions, eye boogers were not generated by 90 hours. However, in the course of the operation, strand cutting frequently occurred, and continuous operation could not be conducted. During the operation, the shear rate (γ) was 454 [sec$^{-1}$], and the shear stress (τ) was 29 [kPa].

The conditions of the dies used in the extrusion molding in the Examples and the Comparative Examples are shown in Table 1, the properties of the resins used in the extrusion molding are shown in Table 2, and the results of extrusion molding are shown in Table 3.

TABLE 1

| | | Die hole size: inner diameter (Φ) × capillary length (L) (mm) | Taper Half apex angle θ (°) | Depth (mm) | Edge diameter (mm) | Edge diameter/ inner diameter | Number of die hole | Arrangement of holes | Shear rate (γ) (1/sec) | Shear stress (τ) (kPa) |
|---|---|---|---|---|---|---|---|---|---|---|
| Example | 1 | 3.0Φ × 13L | 10 | 1.4 | 3.5 | 1.17 | 17 | Staggered state | 181 | 107 |
| | 2 | 3.8Φ × 15L | — | — | (3.8) | — | 17 | Series | 454 | 60 |
| | 3 | 3.0Φ × 13L | 15 | 1.5 | 3.8 | 1.09 | 17 | Staggered state | 154 | 180 |
| | 4 | 3.0Φ × 13L | 15 | 1.5 | 3.8 | 1.09 | 17 | Staggered state | 454 | 118 |
| Comparative Example | 1 | 2.4Φ × 11L | — | — | (2.4) | — | 17 | Series | 1801 | 233 |
| | 2 | 2.2Φ × 11L | 5 | 1 | 2.4 | 1.09 | 17 | Series | 338 | 352 |
| | 3 | 3.0Φ × 13L | 15 | 1.5 | 3.8 | 1.09 | 17 | Staggered state | 454 | 29 |

TABLE 2

| | | Resin | Viscosity average molecular weight (Mv) | Terminal hydroxyl group concentration (mol %) | Degree of branching (mol %) |
|---|---|---|---|---|---|
| Example | 1 | P-4 | 21000 | 1.4 | — |
| | 2 | P-1 | 15300 | 9.5 | 0.23 |
| | 3 | P-2 | 21200 | 13.7 | 0.31 |
| | 4 | P-3 | 25800 | 33.8 | 0.45 |
| Comparative Example | 1 | P-1 | 15300 | 9.5 | 0.23 |
| | 2 | P-5 | 30100 | 1.3 | — |
| | 3 | P-1 | 15300 | 9.5 | 0.23 |

TABLE 3

| | | Extrusion amount (kg/hr) | Resin temperature (°C.) | Apparent viscosity (μ) (PaS) | Time at which eye boogers are generated (hr) |
|---|---|---|---|---|---|
| Example | 1 | 50 | 300 | 590 | 103 |
| | 2 | 160 | 290 | 132 | 82 |
| | 3 | 160 | 310 | 397 | 74 |
| | 4 | 160 | 350 | 260 | 79 |
| Comparative Example | 1 | 160 | 290 | 129 | 4 |
| | 2 | 30 | 320 | 1043 | 6 |
| | 3 | 160 | 290 | 64 | 90** |

**Strand cutting frequently occurred, and continuous operation could not be conducted.

As shown in Tables 1 to 3, according to the production method of the present embodiment, when extrusion molding is conducted using a die having a taper having a half apex angle (θ) of from 4 to 20° formed at a die hole outlet part in a shear rate (γ) at an extruder outlet in a range of from 100 to 500 sec$^{-1}$ and a shear stress (τ) in a range of from 50 to 200 kPa in pelletizing an aromatic polycarbonate, eye boogers at the time of extrusion molding are reduced, and continuous operation over a long period of time is possible.

While the invention has been described in detail and with reference to the specific embodiments thereof, it will be apparent to one skilled in the art that various changes and modifications can be made therein without departing from the spirit and scope thereof.

This application is based on Japanese Patent Application (Patent Application No. 2007-014309) filed Jan. 24, 2007 and Japanese Patent Application (Patent Application No. 2007-291018) filed Nov. 8, 2007, the entire contents thereof being hereby incorporated by reference.

INDUSTRIAL APPLICABILITY

According to the present invention, in the production of an aromatic polycarbonate, eye boogers at the time of extrusion molding are reduced, and continuous operation over a long period of time is possible. Therefore, the industrial value of the present invention is remarkable.

The invention claimed is:

1. A production method of an aromatic polycarbonate, comprising extrusion molding an aromatic polycarbonate with an extruder and pelletizing the same wherein
   a shear rate ($\gamma$) at an outlet of the extruder is in a range of from 100 to 500 sec$^{-1}$, and a shear stress ($\tau$) at the outlet of the extruder is in a range of from 50 to 200 kPa,
   wherein a viscosity average molecular weight (Mv) is 13,000 or more, the proportion of hydroxyl group (OH) in the whole terminal groups is from 5 to 50 mol %, and a ratio of the total mole number of branched structural units to one mole of a structural unit represented by the following formula (a) is from 0.1 to 0.8 mol %:

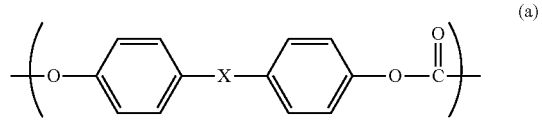

(a)

wherein X represents a single bond, an alkylene group having from 1 to 8 carbon atoms, an alkylidene group having from 2 to 8 carbon atoms, a cycloalkylene group having from 5 to 15 carbon atoms, a cycloalkylidene group having from 5 to 15 carbon atoms, or a divalent group selected from the group consisting of —O—, —S—, —CO—, —SO— and —SO$_2$—.

2. The production method of an aromatic polycarbonate as claimed in claim 1, wherein a die for extruder having a taper having a half apex angle of from 4 to 20° formed on the outlet part of the die for extruder is used.

3. The production method of an aromatic polycarbonate as claimed in claim 1, wherein die holes formed on a die plate are arranged in a staggered state.

4. The production method of an aromatic polycarbonate as claimed in claim 1, wherein the aromatic polycarbonate is obtained by a reaction between an aromatic dihydroxy compound and a carbonic diester.

5. The production method of an aromatic polycarbonate as claimed in claim 2, wherein die holes formed on a die plate are arranged in a staggered state.

6. The production method of an aromatic polycarbonate as claimed in claim 2, wherein the aromatic polycarbonate is obtained by a reaction between an aromatic dihydroxy compound and a carbonic diester.

7. The production method of an aromatic polycarbonate as claimed in claim 3, wherein the aromatic polycarbonate is obtained by a reaction between an aromatic dihydroxy compound and a carbonic diester.

8. The production method of an aromatic polycarbonate as claimed in claim 5, wherein the aromatic polycarbonate is obtained by a reaction between an aromatic dihydroxy compound and a carbonic diester.

* * * * *